United States Patent [19]

Chandler

[11] 3,991,006

[45] Nov. 9, 1976

[54] PLASTIC MOLDING FORMULATION REINFORCED WITH ORGANIC FIBERS

[75] Inventor: Herman Chandler, Newburgh, N.Y.

[73] Assignee: GAF Corporation, New York, N.Y.

[22] Filed: Dec. 31, 1974

[21] Appl. No.: 537,788

[52] U.S. Cl. .......................... 260/40 R; 260/42.43; 260/42.46; 260/42.47; 260/42.49; 260/998.15

[51] Int. Cl.² ...................... C08K 3/26; C08K 7/02

[58] Field of Search .......... 260/998.15, 40 R, 42.43, 260/42.46, 42.47, 42.49

[56] References Cited
UNITED STATES PATENTS 3,502,611  11/1967  Palmer et al. .................. 260/998.15

FOREIGN PATENTS OR APPLICATIONS 1,331,788  9/1973  United Kingdom

OTHER PUBLICATIONS

Penn, W. S., PVC Technology, Wiley Interscience, 1971, p. 235.

Sarvetnick, Harold A., Polyvinyl Chloride, Van Nostrand Reinhold Co., New York, 1969, p. 109.

Oleesky et al., Handbook of Reinforced Plastics, Reinhold Pub. Corp., New York, 1964, p. 197.

*Primary Examiner*—James H. Derrington
*Attorney, Agent, or Firm*—Walter C. Kehm; Joshua J. Ward

[57] ABSTRACT

A plastic formulation is disclosed suitable for the manufacture of tile and the like. The formula comprises an intimate mixture of a resin and an organic fibrous filler. In accordance with this invention, the plastic formulation also comprises, in uniform dispersion, from 20 to 80 percent by weight of a particulate filler such as calcium carbonate, having a particle size of no more than 20 microns. This extremely fine particulate filler facilitates the uniform dispersion of the organic, fibrous filler.

17 Claims, No Drawings

PLASTIC MOLDING FORMULATION REINFORCED WITH ORGANIC FIBERS

BACKGROUND OF THE INVENTION

Fiber-filled plastic compositions are widely used for making floor and wall tile, as well as for many other uses where the toughness which is imparted by fiber reinforcement is desired. In flexible fiber reinforced plastic compositions, asbestos fibers have been commonly used, and continue to be used because of their many advantages, despite the major disadvantage that asbestos fibers are carcinogenic. Thus, the manufacture of plastic formulations containing asbestos presents difficult safety problems for the manufacturer.

Accordingly, it would be desirable to substitute the asbestos fibers in flexible plastic tile formulations and the like with another fiber, for example, organic fibers such as polyester (Dacron) fibers. However, the use of such fibers on a commercial basis in plastic formulations has proven to be difficult, because the fibers have hitherto not dispersed easily throughout the plastic formulations during mixing. Accordingly, the finished products do not exhibit the desirable physical characteristics that one might expect from a fiber-reinforced plastic formulation. For example, the prior art finished products tend to exhibit insufficient tack, and thus do not adhere well to rollers for processing into sheet form.

In British Pat. No. 1,331,788, it is proposed to mix organic fibers into a plastic formulation for tile or the like, along with ground limestone particles (calcium carbonate) which generally range in particle size between 20 mesh and 200 mesh, to improve the structural properties of the tile such as abrasion resistance and hardness. However, the dispersion problem of organic fibers remains when ground limestone of this particle size is used, even when minor fractions of the limestone filler are smaller than 200 mesh.

In accordance with this invention, plastic formulations are disclosed in which an organic, fibrous filler may be more uniformly dispersed, avoiding visible clumps of fiber in the fiber formation. The plastic formulations of this invention may be mixed to uniformly disperse the fibers and avoid visible clumps of agglomerated fibers, without the use of an undesirably vigorous mixing procedure. Furthermore, plastic formulations which are tough and strong at room temperature, yet which are soft enough at elevated temperatures to be effectively rolled into sheeting of the desired thickness, are provided by this invention.

Furthermore, in accordance with this invention, less than 20 percent by weight of resin component can be effectively utilized in the formulations of this invention, which is considerably less resin than has been conventionally used in conjunction with asbestos-filled formulations. This can reduce the overall price of the formulations of this invention, when compared with asbestos formulations, since the resin component is generally one of the most expensive ingredients, on a per pound basis, used in plastic formulations.

DESCRIPTION OF THE INVENTION

In accordance with this invention, a plastic formulation is disclosed suitable for the manufacture of tile and the like. The formulation comprises an intimate mixture of a customary resin of a desirable type for plastic formulations, and an organic, fibrous filler. In accordance with this invention, the formulation also comprises, in uniform dispersion, from 20 to 80 percent by weight of a particulate filler having a particle size of no more than 20 microns.

It has been found that the presence of particulate filler, and particularly calcium carbonate particles, of this size range and in the concentration specified, permits the uniform dispersion of the organic, fibrous filler with greater ease. Accordingly, lower temperatures and less vigorous mixing may be applied to the formulation in order to obtain the uniform dispersion, while obtaining a plastic composition which has better physical characteristics.

It is particularly preferred for the plastic formulations of this invention to be essentially free of asbestos, thus avoiding toxicity problems during and after manufacture of the formulations. Furthermore, the asbestos-free formulations of this invention can utilize reduced amounts of resin ingredient and plasticizer (if used), usually less than 20 percent by weight, while the best asbestos-containing formulations utilize over 20 percent by weight of resin and plasticizer.

It is generally most preferred for the particulate filler used in this invention to have a particle size of less than 15 microns, for example, with an average particle size of 4 to 5 microns.

Furthermore, other filler materials may be used in substitution for calcium carbonate particles, although many of them have known drawbacks. For example, talc would be suitable in some instances, except for a possible toxicity problem similar to that of asbestos. Silica may be used except that it exhibits an undesirable abrasive action on the processing machinery. Carbon black may be used if a black formulation is desired. Titanium dioxide may be used, but is undesirably expensive.

The resin ingredient of this invention may be any desired plastic resin suitable for making plastic compounds as desired. For example, conventional vinyl chloride-vinyl acetate copolymers plus appropriate plasticizers may be used, such as dioctyl phthalate, diisononyl phthalate, butyl benzyl phthalate, or other phthalate plasticizers. Tricresyl phosphate, dipropylene glycol dibenzoate, epoxidized soy bean oil, or any appropriate plasticizer may also be used. Hydrocarbon resins such as polyethylene, chlorinated polyethylene, poly(ethylene-acrylic acid), and the like may also be used herein as the resin ingredient.

The tile formulations of this invention may preferably include, in conjunction with a conventional vinyl chloride-vinyl acetate resin, from about 4 to 10 percent by weight of a terpolymer resin comprising branched poly-(ethylene-vinyl chloride-vinyl acetate) molecules comprising from about 85 to 90 percent by weight of vinyl chloride units; from about 7 to 14 percent by weight of vinyl acetate units; and from about 1 to 3 percent by weight of ethylene units.

In particular, the branched terpolymer resin preferably contains about 89 percent by weight of vinyl chloride units, about 9.6 percent by weight of vinyl acetate units, and about 1.5 percent by weight of ethylene units. The composition may be manufactured by grafting vinyl chloride onto an ethylene-vinyl acetate copolymer. The material may have a relative viscosity, as a 0.5 percent (wt./vol.) solution in tetrahydrofuran at 25° C. of about 1.42.

One suitable resin ingredient for use with conventional vinyl chloride-vinyl acetate resins is manufactured by the Union Carbide Company under the name "VNAT resin." This material has been found to be exceptionally desirable as an ingredient for plastic formulations intended to be milled at high temperatures into flexible asbestos-free tile.

Another suitable resin ingredient for use in the formulation of this invention may comprise a mixture of (a) 5.6 parts by weight of a high molecular weight vinyl chloride-vinyl acetate copolymer containing 14 percent by weight acetate units, and having an inherent viscosity of about 0.71 as indicated by ASTM Method D1243-66 (Method A); plus (b) 2.8 parts by weight of chlorinated polyethylene resin. Such a type of vinyl chloride-vinyl acetate copolymer is also made by the Union Carbide Company. The chlorinated polyethylene resin preferably contains about 45 percent by weight of chlorine, and may have a viscosity of 20,000 poises as measured by an Instron Rheometer at 190° C. and a 150 sec. $^{-1}$ shear rate.

Conventional tile resins, such as Firestone 4301, a vinyl chloride-vinyl acetate resin, are also customarily included. The Firestone 4301 resin has a relative viscosity, as a 0.5 percent (wt./vol.) solution in tetrahydrofuran at 25° C. of 1.24, and has an inherent viscosity of about 0.44 to 0.50 as measured by ASTM Method D1243-66.

In general, the formulations of this invention will contain about 10 to less than about 20 percent by weight of the resin component (resin and plasticizer combined).

The organic, fibrous filler utilized in this invention preferably constitutes Dacron fibers (polyethylene terephthalate), but they may also constitute other known organic fibers such as a nylon-type fiber, or other polyesters, or the like. The fibers are typically 0.001 inch in width and may, on the average, each be about 0.02 to 0.15 inch long, and generally about 0.03 to 0.05 inch in length. Preferably, about 1 to 4 percent by weight of plastic fibers are present in the formulation of this invention, with 3 by weight being the most generaly preferred maximum.

It is also preferred for the formulation of this invention to contain, typically, from about 0.5 to 2 percent by weight of a thermoplastic (i.e. low crosslink density) butadiene-acrylonitrile rubber, which can serve as a solid plasticizer, and also increases the impact resistance of the formulation at high temperatures in a way not provided by other materials generally thought to be plasticizers, such as polycaprolactone. In particular, a suitable thermoplastic butadiene-acrylonitrile rubber is Hycar 1452P, which is available from the B. F. Goodrich Chemical Company. This material contains about 33 percent by weight of acrylonitrile units, and has a viscosity, as a 20 percent (wt./vol.) solution in methyl ethyl ketone, of about 2500 cps.

Other ingredients in weight proportions of about 0.5 to 5 percent may also be added to the formulations of this invention as desired. For example, wood or tall oil rosin may be added as a mixing-wetting aid. Poly(alpha-methyl styrene) may be added as a processing aid. This latter material serves as a lubricant at the high processing temperatures, since it softens at 210° F., but is a solid at room temperature. Barium and cadmium soaps or the like may also be added as heat stabilizers, as can various other pigments, plasticizers, fillers, and the like.

In particular, coarse limestone of about 40 to 200 mesh (200 mesh is about a 74 micron particle size) may be added in weight proportions of about 20 to 60 percent to further reduce the cost of these formulations, and to adjust their physical properties as desired.

The preferred formulations of this invention can be formed into tiles as desired by rolling, milling, or extrusion at elevated temperatures, while at the same time they have high strength and relatively low elongation at lower temperatures, due to fiber reinforcement, as is characteristic of high quality plastic tiles.

The formulations of this invention may of course be used in any other desired way besides making plastic tiles, where fiber reinforcement is desired in a plastic compound, and where there is a need for the plastic fibers to be well dispersed. In tile manufacture, particularly where the formulation is rolled, it has been found that poorly dispersed organic fibers in the formulation cause the plastic to fail to adhere adequately to the rollers for processing. Accordingly, such material cannot be easily worked into uniform sheeting, from which the tiles are cut.

However, in accordance with this invention, when the organic fibers are uniformly dispersed without encountering sufficient shearing action or heat to degrade them, the resulting formulation adheres to the processing rollers in a desirable manner for effective fabrication of tiles or the like.

The examples below are intended to provide illustrative embodiments of the invention of this application, and are not intended to define the scope of the invention, which is as defined in the claims below. All parts and proportions referred to herein and in the appended claims are by weight unless otherwise indicated.

EXAMPLE 1

A floor tile formulation was prepared from the following ingredients:

| | | |
|---|---|---|
| (A). A vinyl chloride-vinyl acetate copolymer resin (such as Firestone 4301) | 5.3 | parts by weight |
| VNAT resin of Union Carbide (see above for detailed description) | 5.7 | " |
| A plasticizer mixture of 97 per cent by weight diisononyl phthalate, plus 3 per cent by weight of epoxidized soybean oil | 2.7 | " |
| A butadiene-acrylonitrile thermoplastic rubber (Hycar 1452P) | 1 | " |
| Stabilizers (Ba/Ca soaps) | 0.8 | " |
| Poly(alpha-methyl-styrene-Amoco 18-210) | 0.8 | " |
| Tall oil rosin (Reichold Chemical Co.) | 0.8 | " |
| Powdered calcium carbonate of less than 20 micron particle size and having an average particle size of 4.5 microns (Atomite) | 25 | " |
| 40 mesh crushed limestone | 53.9 | " |
| White pigment | 1 | " |
| Organic fibers (Dacron 1938 Danberg Chemical Co. Wallingford, Conn.) | 3 | " |

The above mixture was mixed in a Baker-Perkins mixer until flux is achieved (about 6 minutes), and then about 1½ more minutes, at about 240° to 250° F. (final mixture temperature). The mixture is then milled for about 1 minute, the front roll being at 240° F. and the back roll about 300° F. The resulting product is then calendered twice, the top roll being at 200°-210° F. and the bottom roll being about 70°-80° F. The first calender pass was set to reduce the thickness of the formula to 0.09 inch. The second calender pass was set to reduce the thickness to 0.065 inch.

The resulting product exhibited good plasticity, tack (ability to adhere the roll for processing without being excessively adhesive thereto), hot strength, and dimensional stability (at 75° C.). The material also exhibited satisfactory physical properties (such as tensile strength) at room temperature, and accordingly is suitable for use as a plastic tile material, comparable in performance to vinyl-asbestos tile.

B. A similar material was formulated in the manner of Example 1A, with the exception that the 4.5 micron calcium carbonate powder ingredient was replaced completely with 40 mesh crushed limestone; 0.3 part by weight of the plasticizer mixture ingredient was replaced with 40 mesh limestone; and 1.8 extra parts by weight of 40 mesh limestone were added.

It was noted that the Dacron fibers did not mix well into the composition, but instead tended to agglomerate together into clumps. Apparently as the result of this, the resulting composition did not adhere well to the roll during the rolling process, which made it difficult to form it into smooth, blemish-free sheeting prior to cutting into tiles. Furthermore, the composition appeared to have reduced tensile strength for purposes of tensile testing at temperatures ranging from 77° F. to 180° F., when compared with the composition of Example 1A.

The specific tensile testing utilized herein was based upon ASTM D-1708-66 (Reapproved 1970), except that a rectangular strip of sample was used, and not a dumbbell-shaped sample. The specific tensile results at a stretching rate of 2 inches per minute and at various temperatures are as indicated below:

| Temperature | Tensile Strength- Material of Example 1A (psi) | Tensile Strength- Material of Example 1B (psi) |
|---|---|---|
| 77° F. (machine direction) | 1051.9 | 578.1 |
| (Across machine direction) | 444.5 | 330.6 |
| 140° F. (machine direction) | 449.8 | 200.0 |
| 180° F. (machine direction) | 153.0 | 68.7 |
| (Across machine direction) | 26.1 | 26.1 |

EXAMPLE 2

Other formulations were made in accordance with this invention, containing ingredients as indicated in the Table below:

| Ingredient | Formulation No. and Ingredient Amounts in Parts by Weight | | | | | |
|---|---|---|---|---|---|---|
| | 1 | 2 | 3 | 4 | 5 | 6 |
| A vinyl chloride-vinyl acetate copolymer resin (14 per cent acetate) | 5.3 | 5.3 | 5.3 | 5.3 | 12 | 5.6 |
| VNAT Resin of Union Carbide | 5.7 | 5.7 | 5.7 | 5.7 | — | 5.6 |
| A plasticizer mixture of 97 per cent by weight diisononyl phthalate, plus 3 per cent by weight of epoxidized soybean oil | 2.4 | 2.4 | 2.4 | 2.4 | 2.5 | 2.7 |
| Butadiene-acrylonitrile thermoplastic rubber (Hycar 1452P) | 1.0 | 1.0 | 1.0 | 1.0 | — | 1.0 |
| Stabilizer (AG717-Tenneco) | 0.5 | 0.5 | 0.5 | 0.5 | 1.0 | 0.5 |
| Poly(alpha-methyl styrene) (Amoco 18-210) | 0.8 | 0.8 | 0.8 | 0.8 | 0.8 | 1.0 |
| Tall oil Rosin (Reichold Chemical Co.) | 0.8 | 0.8 | 0.8 | 0.8 | 0.7 | 0.6 |
| Powdered calcium carbonate of less than 20 micron particle size and average particle size of 4.5 microns | 59 | 58 | 59 | 58 | 25 | 30 |
| 40 mesh crushed limestone | 22.5 | 22.5 | 22.5 | 22.5 | 51 | 50 |
| White pigment (TiO$_2$) | 1.0 | 1.0 | 1.0 | 1.0 | 2.5 | 1 |
| Dacron Polyester 1938 fibers (Danberg Chemical Co.) | 1.0 | 2.0 | — | — | 4 | 2.0 |
| Nylon Fibers (Danberg Chemical Co.) | — | — | 1.0 | 2.0 | — | — |
| Flexol EPO | — | — | — | — | 0.5 | — |

In all of these formulas, the mixing of the organic fibers into uniform dispersion was adequate, and the materials had fair to good mill tack, permitting them to be retained on the mill rollers for processing. The materials also had fair to good plasticity and hot strength, as is needed for good processing of the formulations.

Each of the materials was mixed and processed in accordance with Example 1.

EXAMPLE 3

850 pounds of a plastic formulation was prepared containing the following ingredients:

| Ingredient | Ingredient Amounts in Parts by Weight |
|---|---|
| A vinyl chloride-vinyl acetate copolymer resin (14 per cent acetate) | 5.1 |
| VNAT Resin of Union Carbide | 5.6 |
| A plasticizer mixture of 97 per cent by weight diisononyl phthalate, plus 3 per cent by weight of epoxidized soybean oil | 2.6 |
| Butadiene-acrylonitrile thermoplastic rubber (Hycar 1452P) | 1 |
| Poly(alpha-methyl styrene) (Amoco 18-210) | 0.8 |
| Tall oil Rosin (Reichold Chemical Co.) | 0.8 |
| Dacron Polyester 1938 fibers (Danberg Chemical Co.) | 3 |
| Powdered calcium carbonate of less than 20 micron particle size and average particle size of 4.5 microns | 27 |

-continued

| Ingredient | Ingredient Amounts in Parts by Weight |
|---|---|
| 40 mesh crushed limestone | 52.6 |
| White pigment (TiO$_2$) | 1 |
| Stabilizer (AG 717-Tenneco) | 0.5 |

The formulation was processed on a commercial milling line for tile manufacture at the manufacturing facility of the GAF Building Products Division in Vails Gate, N.Y. The resulting formulation was noted to have good mill tack (adhesion to the mill for processing). Optimum results were obtained with a mix time for the formulation of 1 minute and 55 seconds in Banbury mixer at 330° F., with the best mill tack being obtained when the front mill roll is heated to 240° F. and the back mill roll 300° F. On the milling line, the first calendering top roll was maintained at a temperature of 218° to 220° F. with the gauge of the rolled plastic formulation being 0.09 to 0.095 inch thick, after the first calendering step. The amperage consumption of the first calender was 100 to 120 amps.

The second calendering top roll was maintained at 240° to 250° F., and the gauge of the formulation after the second calendering roll step was 0.063 to 0.065 inch, with an amperage consumption of the second calender being 60 to 70 amps. A Planisher (smoothing) station was provided at a temperature of 175°–180° F., for finishing the rolled sheet prior to cutting into tile.

The resulting cut tile had an impact resistance that was generally equivalent to commercial vinyl asbestos tile, but with an Instron flexibility rating that was marginally lower than commercial vinyl asbestos tile at 50° F. and at 77° F. The dimensional stability and the tensile strength at 140° F. and 180° F. was generally equivalent to commercial vinyl asbestos tile, although the tensile strength at 50° F. and 77° F. and the abrasion resistance, were slightly lower.

The tile prepared in accordance with this Example is generally of high quality and suitable for commercial usage, although it contained no asbestos, and utilized only 13.3 percent by weight of resin and plasticizer ingredient, when compared with the substantially higher resin and plasticizer usage of asbestos-filled tile formulation. (Usually about 25 percent).

EXAMPLE 4

A plastic formulation was prepared including the following ingredients:

| Ingredient | Ingredient Amounts in Parts by Weight |
|---|---|
| A vinyl Chloride-vinyl acetate copolymer resin (14 per cent acetate) | 5.6 |
| A high molecular weight vinyl chloride-vinyl acetate copolymer (14 per cent by weight acetate) (VSKK Resin Union Carbide Company) | 2.8 |
| Chlorinated polyethylene (45 per cent by weight of chlorine, viscosity by Instron Rheometer at 190° C. and a 150 sec.$^{-1}$ shear rate—20,000 poises) | 2.8 |
| A plasticizer mixture of 97 per cent by weight diisononyl phthalate, plus 3 per cent by weight of epoxidized soybean oil | 2.6 |
| Butadiene-acrylonitrile thermoplastic rubber (Hycar 1452P) | 1 |
| Stabilizer (AG717-Tenneco) | 0.5 |
| Poly(alpha-methyl styrene) (Amoco 18-210) | 1 |
| Tall oil Rosin (Reichold Chemical Company) | 0.6 |
| Dacron Polyester 1938 fibers (Danberg Chemical Company) | 2 |
| Powdered calcium carbonate of less than 20 micron particle size and average particle size of 4.5 microns (Atomite) | 30 |
| 40 mesh crushed limestone | 50 |
| White pigment (TiO$_2$) | 1 |

The resulting product was mixed while heating in a Baker-Perkins Mixer for 2½ minutes. Thereafter, it was found to have good plasticity, tack and hot strength, with the Dacron fibers being uniformly mixed. It exhibited the following tensile strengths as tested in the manner of Example 1:

| 77° F. | 734.4 psi. |
|---|---|
| 140° F. | 201.2 psi. |
| 180° F. | 94.4 psi. |

The material also had good impact strength and other properties making it potentially useful as a tile formulation.

EXAMPLE 5

The following formulations were made in accordance with this invention, containing ingredients as indicated in the table below:

| Ingredient | Formulation No. and Ingredient Amounts in Parts by Weight | | |
|---|---|---|---|
| | 7 | 8 | 9 |
| A vinyl chloride-vinyl acetate copolymer resin (14 per cent by weight) (VCJE-10 resin-Union Carbide Corporation) | 5.1 | 5.1 | 4 |
| VNAT Resin of Union Carbide | 5.6 | 5.64 | 6.8 |
| Diisononyl phthalate plasticizer | 2.6 | 2.6 | 2.6 |
| Butadiene-acrylonitrile thermoplastic rubber (Hycar 1452P) | 1 | 1 | 1 |
| Tall oil Rosin | 0.8 | 0.8 | — |
| Poly(alpha-methyl styrene) | 0.8 | 0.8 | 1.2 |
| Barium/Cadmium soap stabilizer (Mark-140, Argus Chemical Corp.) | 0.8 | 0.5 | 0.8 |
| Polyester 1892 fibers from Danberg Chemical Company | 3 | 2 | 2.5 |
| Powdered calcium carbonate of less than 20 micron particle size and average particle size of 4.5 microns | 27 | 22.5 | 40 |
| 40 mesh crushed limestone | 52.3 | 58.05 | 41 |
| Titanium dioxide pigment | 1 | 1 | — |

The formulations were mixed and rolled into a sheet in the manner of Example 1, to form plastic tiles which are comparable in performance with vinyl-asbestos tiles of conventional formulation.

This invention has been disclosed with respect to certain preferred embodiments, and it will be understood that various modifications and variations thereof obvious to persons of ordinary skill in the art are included within the spirit and purview of this application and the scope of the appended claims.

That which is claimed is:

1. In a plastic formulation which is suitable for the manufacture of tile and the like, said formulation comprising an intimate mixture of
   a. a resin selected from the group consisting of vinyl chloride/vinyl acetate copolymer, hydrocarbon resins and mixtures thereof; and
   b. an organic, fibrous filler not easily dispersed in said formulation;
   the improvement whereby said formulation also comprises in uniform dispersion from 20 to 80 percent by weight of filler of a particle size of no more than 20 microns, whereby said organic fibrous filler may also be uniformly dispersed.

2. The plastic formulation of claim 1 in which said filler of a particle size of no more than 20 microns is calcium carbonate.

3. The plastic formulation of claim 2 which is essentially free of asbestos.

4. The plastic formulation of claim 3 in which from 4 to 10 percent by weight of a terpolymer resin is also present, said terpolymer resin comprising branched poly(ethylene-vinyl chloride-vinyl acetate) molecules comprising from 85 to 90 percent by weight of said vinyl chloride units, from 7 to 14 percent by weight of vinyl acetate units and from 1 to 3 percent by weight of ethylene units.

5. The plastic formulation of claim 4 in which the resin comprises vinyl chloride/vinyl acetate copolymer.

6. The plastic formulation of claim 5 which includes from 0.5 to 2 percent by weight of a thermoplastic butadiene/acrylonitrile rubber.

7. The plastic formulation of claim 5 in which the fibers of the fibrous filler average between about 0.02 and about 0.15 inch long.

8. The plastic formulation of claim 5 in which from 20 to 50 percent by weight thereof consists essentially of calcium carbonate particles of less than 10 microns in size.

9. The plastic formulation of claim 8 in which from 20 to 60 percent by weight of crushed limestone is present in addition to said calcium carbonate particles of less than 10 microns in size.

10. The plastic formulation of claim 5 in which from 1 to 4 percent by weight of said organic fibrous filler is present.

11. The plastic formulation of claim 5 in which the fibrous filler material consists essentially of polyester fibers.

12. The plastic formulation of claim 5 in which the fibrous filler material consists essentially of polyethylene terephthalate fibers.

13. The plastic composition of claim 5 in which the organic fibrous filler consists essentially of nylon.

14. The plastic formulation of claim 1 in which the resin is hydrocarbon resin.

15. The plastic composition of claim 5 in which there is present no more than 20 percent by weight of resin plus any plasticizer in the formulation.

16. The plastic formulation of claim 15 in which the resin plus any plasticizer in the formulation is present in amounts between about 10 percent and about 20 percent by weight.

17. The plastic formulation of claim 14 in which the resin comprises chlorinated polyethylene.

* * * * *